United States Patent Office 3,352,919
Patented Nov. 14, 1967

3,352,919
4-PHOSPHORINANONES AND METHOD
OF PREPARING SAME
Richard Parke Welcher, Old Greenwich, Conn., assignor
to American Cyanamid Company, Stamford, Conn., a
corporation of Maine
No Drawing. Filed Feb. 18, 1965, Ser. No. 433,768
13 Claims. (Cl. 260—586)

This application is a continuation-in-part of application Ser. No. 161,405, filed Dec. 22, 1961, now abandoned.

This invention relates to novel 4-phosphorinanones and to a novel method for preparing phosphorinanones.

More particularly, this invention relates to compounds of the general formula:

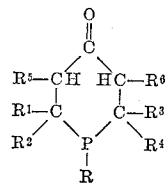

where R is a member selected from the group consisting of substituted and unsubstituted, branched and straight chain alkyl ($C_1$–$C_{18}$), substituted and unsubstituted cycloalkyl, substituted and unsubstituted aryl; $R^1$, $R^2$, $R^3$ and $R^4$ each represent a member selected from the group consisting of hydrogen, lower alkyl, phenyl, chlorosubstituted phenyl, lower alkyl substituted phenyl, cyclohexyl and lower alkoxyalkyl, provided that not more than two of the groups $R^1$–$R^4$ are hydrogen; and $R^5$ and $R^6$ each represent a member selected from the group consisting of hydrogen, lower alkyl and phenyl.

Two particular advanced groups of compounds coming within the above general formula are those in which the values for $R^1$ and $R^3$ are selected from the group consisting of phenyl, chlorosubstituted phenyl, lower alkyl substituted phenyl, cyclohexyl and lower alkoxyalkyl, and the values for $R^2$ and $R^4$ are selected from the group consisting of hydrogen, lower alkyl and phenyl, and those in which the values for $R^1$, $R^2$, $R^3$ and $R^4$ are selected from the group consisting of lower alkyl. In these advanced compounds, $R^5$ and $R^6$ are as defined above.

These compounds, and compounds in which $R^1$, $R^2$, $R^3$ and $R^4$ may also be hydrogen, may be prepared by reacting a primary phosphine $RPH_2$ with a divinyl ketone (1,4-pentadiene-3-one) of the formula:

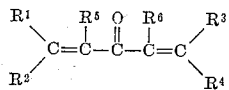

where R is as represented above, $R^1$, $R^2$, $R^3$ and $R^4$ are members selected from the group consisting of hydrogen, lower alklyl, phenyl, chlorosubstituted phenyl, lower alkyl substituted phenyl, cyclohexyl and lower alkoxyalkyl; and $R^5$ and $R^6$ each represent a member selected from the group consisting of hydrogen, lower alkyl and phenyl.

It will be noted that the process of this invention is of a general character and one suited for the preparation of 4-phosphorinanones wherein the values $R^1$–$R^4$ may be a number of moieties, including hydrogen, while the novel compound aspects of this invention do not include compounds wherein more than two of the moieties represented by $R^1$–$R^4$ are hydrogen.

Cyclic phosphorinanones, wherein $R^1$–$R^6$ in the above general formula are all hydrogen, may be prepared in accordance with the procedure outlined in U.S.P. 3,094,545. The process therein described to produce such compounds involves two steps. The first is the cyclization of a bis(2-cyanoethyl)tertiary phosphine corresponding to the formula $(NCCH_2CH_2)_2PR$. The second step is hydrolysis of the initial cyclization product to form the 4-phosphorinanone.

A brief consideration of this procedure reveals that it is not applicable to the preparation of the compounds of the present invention, because the required starting materials simply are not available. Thus, to make the compounds of the present invention by the patented process, it would be necessary to have as starting materials bis(1-alkyl or 1-aryl-2-cyanoethyl) tertiary phosphine materials corresponding to the formula $(NCCH_2CHR')_2PR$. The 1-alkyl or 1-aryl groups would appear as 2,6-dialkyl or 2,6-diaryl substituents in the final 4-phosphorinanones. But these branched-chain cyano-containing tertiary phosphines are not available by a practical process.

An explanation as to why bis(1-alkyl or 1-aryl-2-cyanoethyl) tertiary phosphines are not available can be found in the published literature. In order to prepare these tertiary phosphines, it would be necessary to add a primary phosphine $RPH_2$ to two moles of an internal-olefinic nitrile $R'CH=CHCN$, a hindered olefin. Although primary phosphines have been added to acrylonitrile (a terminal-olefinic nitrile) to give tertiary phosphines, there is no recorded instance where an internal-olefinic nitrile has been used. See M. M. Rauhut, I. Hechenbleikner, H. A. Currier, F. C. Schaefer and V. P. Wystrach, J. Am. Chem. Soc. 81, 1103 (1959). Furthermore, the addition of a primary phosphine to hindered olefins in general has been shown to give predominantly the secondary phosphines rather than tertiary phosphines See M. M. Rauhut, H. A. Currier, A. M. Semesel and V. P. Wystrach, J. Org. Chem. 26, 5138 (1961).

The above explanation demonstrates the unobviousness of the compounds of this invention and the novel process described herein over the disclosure of U.S.P. 3,094,545. The question may arise whether the compounds described in the aforesaid patent could be prepared by the process of the present invention. The answer is that such a preparation would also be highly unlikely since it would involve heating a primary phosphine $RPH_2$ with divinyl ketone, a compound having the formula $(CH_2=CH)_2C=O$. Not only is the preparation of the starting material, divinyl ketone, difficult [see S. F. Reed, J. Org. Chem. 27, 4116 (1962)] but the divinyl ketone itself is unstable, polymerizing at room temperature or upon the attempted preparation of simple derivatives.

The novel products of the present invention are best prepared by bringing the primary phosphine reactant and the 1,4-dien-3-one reactant into reactive contact at a temperature in the range of 80° C. to 200° C. and recovering the 4-phosphorinanone product by volatilization, for example, at a reduced pressure in the range of 0 to 760 millimeters. Reaction is best carried out in a substantially inert atmosphere, such as in a nitrogen or helium atmosphere, or the like. No catalyst or solvent is necessary for the process contemplated herein.

Furthermore, the process of the present invention is generally carried out at atmospheric pressure. Superatmospheric pressures as high as 700 pounds per square inch may likewise be used, particularly with low-boiling reactants. Usually, however, very good results are achieved at atmospheric pressure.

Similarly, stoichiometric quantities of the reactants are generally employed. Nevertheless, small excesses of either reactant may be present without detrimentally affecting the nature of the reaction.

Generally, the reactants are heated for at least one hour, but this is not critical since incipient reaction occurs upon intermingling the reactants.

Typically primary phosphines within the purview of the instant discovery are phenylphosphine, cyclohexylphosphine, dodecylphosphine, isopropylphosphine, benzylphosphine, 2 - ethoxyethylphosphine, 2 - cyanoethylphosphine, para-chlorophenylphosphine, methylphosphine, isobutylposphine, ethylphosphine, propylphosphine, butylphosphine, pentylphosphine, hexylphosphine, octylphosphine, heptylphosphine, decylphosphine, undecylphosphine, heptadecylphosphine, octadecylphosphine, etc.

It follows from the above listing that typical substituents for primary alkyl phosphines are lower alkoxy, phenyl, cyano, and the like. Typical substituents for primary aryl phosphines, such as phenyl phosphines, are halogen (e.g., Cl, Br and I) lower alkyl, etc. In other words, substituents which do not interfere with, enter into, i.e., are inert under the conditions of, the reaction are contemplated herein.

Among the divinyl ketone reactants which may be employed herein are:

1,4-hexadien-3-one
1,4-heptadiene-3-one
1,4-octadien-3-one
7-methyl-1,4-octadien-3-one
5-methyl-1,4-hexadien-3-one
5-methyl-1,4-heptadien-3-one
5-methyl-1,4-octadien-3-one
5-ethyl-1,4-heptadiene-3-one
5-propyl-1,4-octadien-3-one
1-cyclohexylidene-3-buten-2-one
5-phenyl-1,4-hexadien-3-one
5-(2'-methoxyethyl)-1,4-nonadien-3-one
divinyl ketone
2,5-heptadien-4-one
2-methyl-2,5-heptadien-4-one
2,8-dimethyl-3,6-nonadien-5-one
phorone or 2,6-dimethyl-2,5-heptadiene-4-one
2,7-dimethyl-3,6-octadien-5-one
4,6-dimethyl-3,7-diethyl-3,6-nonadiene-5-one
2,4-dipropyl-1,4-pentadien-3-one
3,7-diethyl-3,6-nonadiene-5-one
3,7-dimethyl-3,6-nonadien-5-one
5,9-dimethyl-5,8-tridecadiene-6-one
2,6-diphenyl-2,5-heptadiene-4-one
5-methyl-9-ethyl-4,7-tridecadien-6-one
dibenzalacetone
4,4'-dichlorodibenzalacetone
4,4'-dimethyldibenzalacetone
dicuminylideneacetone
2,2'-dichloridibenzalacetone
3,3'-dichlorodibenzalacetone
2,3'-dichlorobenzalacetone
2,4'-dichlorobenzalacetone
3,4'-dichlorobenzalacetone The following examples are carried out at the temperature indicated and using stoichiometric quantities of reactants.

EXAMPLE 1

2,2,6,6-tetramethyl-1-phenyl-4-phosphorinanone

A mixture of 7.0 grams (0.051 mole) of 2,6-dimethyl-2,5-heptadiene-4-one and 5.6 grams (0.051 mole) of phenylphosphine (transferred with a hypodermic syringe) is heated under nitrogen at 115° C.–130° C. for 6 hours. The solution, still yellow-green, crystallizes on cooling. Vacuum distillation gives a total of 9.7 grams of yellowish waxy solid. It is soluble in cold benzene, ether, chloroform, methanol, 2B alcohol, and acetone, soluble in hot acetonitrile, and insoluble in hot hexane and water.

Sublimation of this yellowish waxy solid gives white crystals of 2,2,6,6 - tetramethyl - 1 - phenyl - 4 - phosphorinanone.

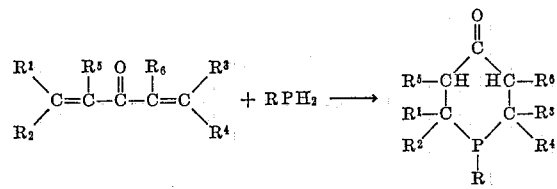

TABLE I

| Ex. No. | (A) Divinyl Ketone | (B) Primary Phosphine | Temp., °C. | (C) Product |
|---|---|---|---|---|
| 2 | 1,4-hexadien-3-one | Phenylphosphine | 115 | 2-methyl-1-phenyl-4-phosphorinanone. |
| 3 | 1,4-heptadien-3-one | Cyclohexylphosphine | 180 | 1-cyclohexyl-2-ethyl-4-phosphorinanone. |
| 4 | 1,4-octadien-3-one | Isobutylphosphine | 100 | 1-isobutyl-2-propyl-4-phosphorinanone. |
| 5 | 7-methyl-1,4-octadien-3-one | Methylphosphine | 80 | 2-isobutyl-1-methyl-4-phosphorinanone. |
| 6 | 5-methyl-1,4-hexadien-3-one | 2-cyanoethylphosphine | 200 | 1-(2'-cyanoethyl)-2,2-dimethyl-4-phosphorinanone. |
| 7 | 5-methyl-1,4-heptadien-3-one | Octylphosphine | 169 | 2-ethyl-2-methyl-1-octyl-4-phosphorinanone. |
| 8 | 5-methyl-1,4-octadien-3-one | Propylphosphine | 90 | 2-methyl-1,2-dipropyl-4-phosphorinanone. |
| 9 | 5-ethyl-1,4-heptadien-3-one | Octadecylphosphine | 170 | 2,2-diethyl-1-octadecyl-4-phosphorinanone. |
| 10 | 5-propyl-1,4-octadien-3-one | Dodecylphosphine | 160 | 1-dodecyl-2,2-dipropyl-4-phosphorinanone. |
| 11 | 1-cyclohexylidene-3-buten-2-one | Phenylphosphine | 160 | 1-phenyl-1-phosphaspiro[5.5]undecan-4-one. |
| 12 | 5-phenyl-1,4-hexadien-3-one | do | 150 | 2-methyl-1,2-diphenyl-4-phosphorinanone. |
| 13 | 5-(2'-methoxyethyl)-1,4-nonadien-3-one | Octylphosphine | 170 | 2-butyl-2(2'-methoxyethyl)-1-octyl-4-phosphorinanone. |
| 14 | Divinyl ketone | 2-cyanoethylphosphine | 180 | 1-(2'-cyanoethyl)-4-phosphorinanone. |
| 15 | 2,5-heptadien-4-one | Pentylphosphine | 110 | 2,6-dimethyl-1-pentyl-4-phosphorinanone. |
| 16 | 2-methyl-2,5-heptadien-4-one | Phenylphosphine | 140 | 2,2,6-trimethyl-1-phenyl-4-phosphorinanone. |
| 17 | 2,6-dimethyl-2,5-heptadiene-4-one | Heptadecylphosphine | 150 | 1-heptadecyl-2,2,6,6-tetramethyl-4-phosphorinanone. |
| 18 | 2,8-dimethyl-3,6-nonadien-5-one | Para-chlorophenylphosphine | 175 | 1-parachlorophenyl-2,6-di-isopropyl-4-phosphorinanone. |
| 19 | 4,6-dimethyl-3,7-diethyl-3,6-nonadiene-5-one | Phenylphosphine | 150 | 2,2,6,6-tetraethyl-3,5-dimethyl-1-phenyl-4-phosphorinanone. |
| 20 | do | 4-chlorophenylphosphine | 200 | 2,2,6,6-tetraethyl-3,5-dimethyl-1-(4'-chlorophenyl)-4-phosphorinanone. |
| 21 | 2,4-dipropyl-1,4-pentadien-3-one | Phenylphosphine | 150 | 1-phenyl-3,5-dipropyl-4-phosphorinanone. |
| 22 | 3,7-diethyl-3,6-nonadiene-5-one | 2'-ethoxyethylphosphine | 90 | 1-(2'-ethoxyethyl)-2,2,6,6-tetraethyl-4-phosphorinanone. |
| 23 | 5-methyl-9-ethyl-4,7-tridecadien-6-one | Heptadecylphosphine | 150 | 2-ethylpentyl-6-propyl-1-heptadecyl-4-phosphorinanone. |
| 24 | 5,9-dimethyl-5,8-tridecadiene-6-one | Methylphosphine | 80 | 2,6-dibutyl-1,2,6-trimethyl-4-phosphorinanone. |
| 25 | 2,6-diphenyl-2,5-heptadiene-4-one | Dodecylphosphine | 190 | 1-dodecyl-2,6-dimethyl-2,6-dipheny-4-phosphorinanone. |
| 26 | Dibenzalacetone | Phenylphosphine | 120 | 1,2,6-triphenyl-4-phosphorinanone. |
| 27 | 4,4'-dichlorodibenzalacetone | Octylphosphine | 160 | 2,6-bis(4'-chlorophenyl)-1-octyl-4-phosphorinanone. |
| 28 | 4,4'-dimethyldibenzalacetone | 2-cyanoethylphosphine | 175 | 1-(2'-cyanoethyl)-2,6-di-(4''-methylphenyl)-4-phosphorinanone. |
| 29 | Dicuminylideneacetone | Propylphosphine | 115 | 1-propyl-2,6-di-isopropyl-phenyl-4-phosphorinanone. |
| 30 | 1-(2-chlorophenyl)-5-phenyl-1,4-pentadiene-3-one | Cyclohexylphosphine | 120 | 2-chlorophenyl-1-cyclohexyl-6-phenyl-4-phosphorinanone. |
| 31 | 2,2'-dichlorodibenzalacetone | do | 120 | 2,6-bis(2'-chlorophenyl)-1-cyclohexyl-4-phosphorinanone. |

TABLE I—Continued

| Ex. No. | (A) Divinyl Ketone | (B) Primary Phosphine | Temp., °C. | (C) Product |
|---|---|---|---|---|
| 32 | 1-(3-chlorophenyl)-5-phenyl-1,4-pentadiene-3-one | 2-ethoxyethylphosphine | 110 | 2-(3'-chlorophenyl)-1-(2''-ethoxyethyl)-6-phenyl-4-phosphorinanone. |
| 33 | 3,3'-dichlorodibenzalacetone | do | 110 | 2,6-bis(3'-chlorophenyl)-1-(2''-ethoxyethyl)-4-phosphorinanone. |
| 34 | 1-(4-chlorophenyl)-5-phenyl-1,4-pentadiene-3-one | Decylphosphine | 170 | 2-(4'-chlorophenyl)-1-decyl-6-phenyl-4-phosphorinanone. |
| 35 | 2,3'-dichlorodibenzalacetone | Phenylphosphine | 150 | 2-(2'-chlorophenyl)-6-(3''-chlorophenyl)-1-phenyl-4-phosphorinanone. |
| 36 | 2,4'-dichlorodibenzalacetone | 2-butoxyethylphosphine | 115 | 1-(2'-butoxyethyl)-2-(2''-chlorophenyl)-6-(4'''-chlorophenyl)4-phosphorinanone. |
| 37 | 3,4'-dichlorodibenzalacetone | Undecylphosphine | 120 | 2-(3'-chlorophenyl)-6-(4''-chlorophenyl)-1-undecyl-4-phosphorinanone. |

EXAMPLE 38

*1,2,6-triphenyl-4-phosphorinanone*

A mixture of 4.4 grams (0.04 mole) of phenylphosphine and 9.4 grams (0.04 mole) of dibenzalacetone is heated with stirring under nitrogen for 13 minutes at 120° C.–125° C. A clear yellow solution becomes perceptibly viscous after 12 minutes of heating. A hard white glass is obtained on cooling.

This hard white glass is sublimed at 195° C.–200° C. 0.5 millimeter pressure, the resulting yellowish sublimate put through a column of alumina in benzene solution, and the recovered white crystals of product 1,2,6 - triphenyl - 4 - phosphorinanone recrystallized twice from acetonitrile (1 gram/7 millimeters). Alternatively, the yellow sublimate may be purified by washing with ether.

The novel 4-phosphorinanones of the present invention have direct utility as gasoline additives. For example, up to about 10 milliliters of any one of these phosphorinanones, when dissolved in one gallon of gasoline, affords protection against misfiring, surface ignition, and the like.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

I claim:

1. A 4-phosphorinanone of the formula

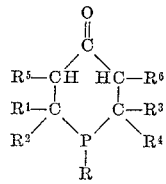

wherein R is alkyl having from 1 to 18 carbon atoms, cycloalkyl, aryl; $R^1$, $R^2$, $R^3$ and $R^4$ each represents a member selected from the group consisting of hydrogen, lower alkyl, phenyl, chloro-substituted phenyl, lower alkyl-substituted phenyl, cyclohexyl and lower alkoxyalkyl, provided that not more than two of the groups $R^1$–$R^4$ are hydrogen; and $R^5$ and $R^6$ each represents a member selected from the group consisting of hydrogen, lower alkyl and phenyl.

2. A 4-phosphorinanone of the formula

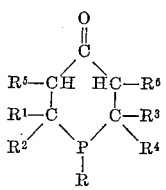

wherein R is alkyl having from 1 to 18 carbon atoms, cyclohexyl, phenyl, halo phenyl or lower alkyl substituted phenyl; $R^1$, $R^2$, $R^3$ and $R^4$ are each lower alkyl; and $R^5$ and $R^6$ each represent a member selected from the group consisting of hydrogen, lower alkyl and phenyl.

3. 1-isobutyl-2,6-diphenyl-4-phosphorinanone.
4. 1-cyclohexyl-2,6-diphenyl-4-phosphorinanone.
5. 1-octyl-2,6-diphenyl-4-phosphorinanone.
6. 1,2,6-triphenyl-4-phosphorinanone.
7. 1-isobutyl-2,2,6,6-tetramethyl-4-phosphorinanone.
8. 1-cyclohexyl-2,2,6,6-tetramethyl-4-phosphorinanone.
9. 2,2,6,6-tetramethyl-1-octyl-4-phosphorinanone.
10. 2,2,6,6-tetramethyl-1-phenyl-4-phosphorinanone.
11. The method which comprises bringing a primary phosphine of the formula $$RPH_2$$

into intimate contact with a divinyl ketone of the formula

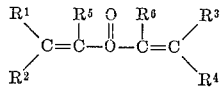

and recovering the resulting 4-phosphorinanone product of the formula

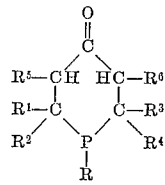

R in the above formulae representing a member selected from the group consisting of alkyl, having from 1 to 18 carbon atoms, cycloalkyl, and aryl; $R^1$, $R^2$, $R^3$ and $R^4$ each represent a member selected from the group consisting of hydrogen, lower alkyl, phenyl, chlorosubstituted phenyl, lower alkyl-substituted phenyl, cyclohexyl and lower alkoxyalkyl; and $R^5$ and $R^6$ each represent a member selected from the group consisting of hydrogen, lower alkyl and phenyl.

12. The process of claim 11 wherein the reactants are brought together at a temperature in the range of 80° C. to 200° C.

13. The process of claim wherein the reactants are brought together at a temperature in the range of 80° C. to 200°C. and the resulting 4-phosphorinanone product recovered by volatilization.

References Cited

UNITED STATES PATENTS

3,045,545   6/1963   Welcher et al. _____ 260—590

OTHER REFERENCES

Welcher et al., Journal of American Chemical Society, August 1960, pp. 4437–8, QD1A5.

DANIEL D. HORWITZ, *Primary Examiner.*

CHARLES B. PARKER, LEON ZITVER, *Examiners.*

D. R. MAHANAND, *Assistant Examiner.*

UNITED STATES PATENT OFFICE
CERTIFICATE OF CORRECTION

Patent No. 3,352,919                        November 14, 1967

Richard Parke Welcher

It is hereby certified that error appears in the above numbered patent requiring correction and that the said Letters Patent should read as corrected below.

Columns 3 and 4, TABLE I, fourth column, line 6 thereof, for "169" read -- 160 --; column 6, lines 31 to 34, for that portion of the formula reading $$\overset{\overset{\displaystyle O}{\|}}{-O-} \quad\quad \text{read} \quad\quad \overset{\overset{\displaystyle O}{\|}}{-C-}$$

same column 6, line 59, for "claim" read -- claim 11 --; line 66, for "3,045,545" read -- 3,094,545 --.

Signed and sealed this 15th day of April 1969.

(SEAL)
Attest:

EDWARD M. FLETCHER, JR.                    EDWARD J. BRENNER
Attesting Officer                              Commissioner of Patents